United States Patent
Yamauchi et al.

(10) Patent No.: US 6,915,317 B1
(45) Date of Patent: Jul. 5, 2005

(54) METHOD OF CONVERTING A LINEAR VALUE TO AN INTEGER

(75) Inventors: Kazushi Yamauchi, Yamato (JP); Satoshi Karube, Kamakura (JP)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 09/616,815

(22) Filed: Jul. 13, 2000

(51) Int. Cl.$^7$ .............................................. G06F 7/00
(52) U.S. Cl. ....................................................... 708/204
(58) Field of Search ................................. 708/204, 442

(56) References Cited

U.S. PATENT DOCUMENTS 5,432,892 A * 7/1995 Hafner et al. ............... 708/442
6,125,304 A * 9/2000 Suzuki ....................... 708/442

* cited by examiner

Primary Examiner—Tan V. Mai
(74) Attorney, Agent, or Firm—Witham, Curtis & Christofferson, P.C.

(57) ABSTRACT

A linear value is converted to an integer equivalent, where a triangle OAB is considered, consisting of the origin 0 (0,0), point A (L,Y) and point B (L,0), and the conversion is accomplished by figuring out the y coordinate value Z of point P, whose x coordinate value is X, out of integral lattice points positioned in the vicinity of side OA in the xy coordinate system. In this method, the y coordinate value Z is figured out by the following core calculation function: f(X,Y) satisfying prescribed conditions: Z=f(X,Y) wherein $0 \leq X \leq L$, $0 \leq Y \leq L$, X,Y: integers, and $L = 2^s - 1$, $S \geq 1$, S: an integer.

5 Claims, 18 Drawing Sheets

[Figure 1]
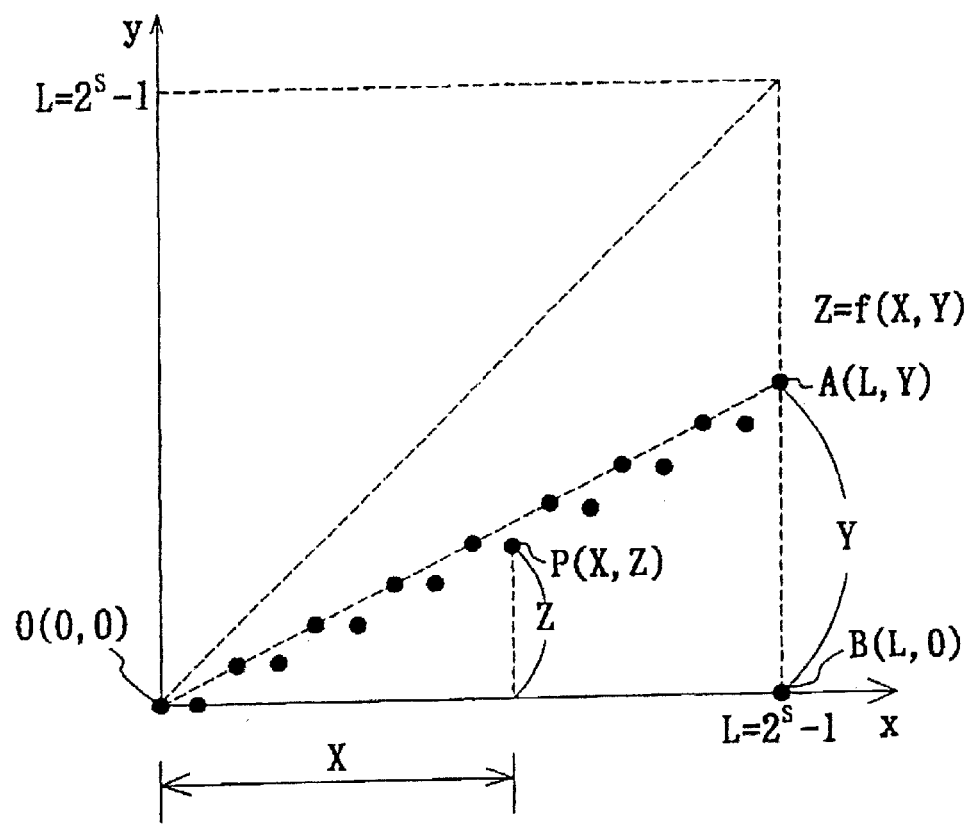

[Figure 2]
(a)
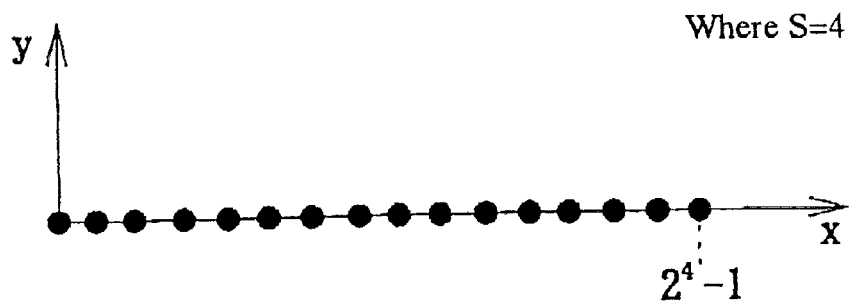
(b)
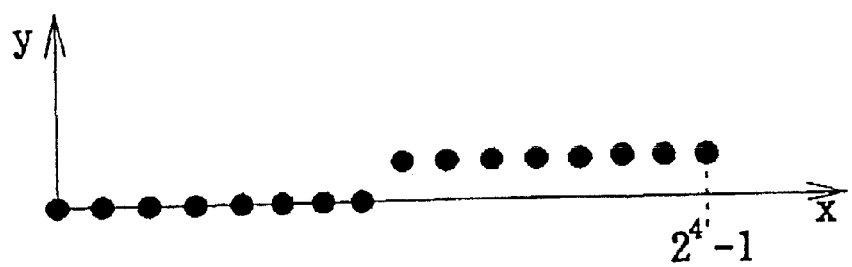
(c)
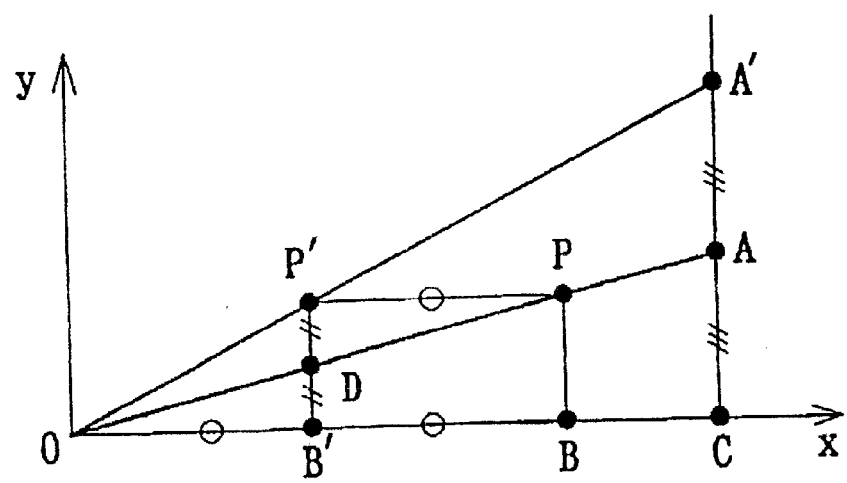

[Figure 3]
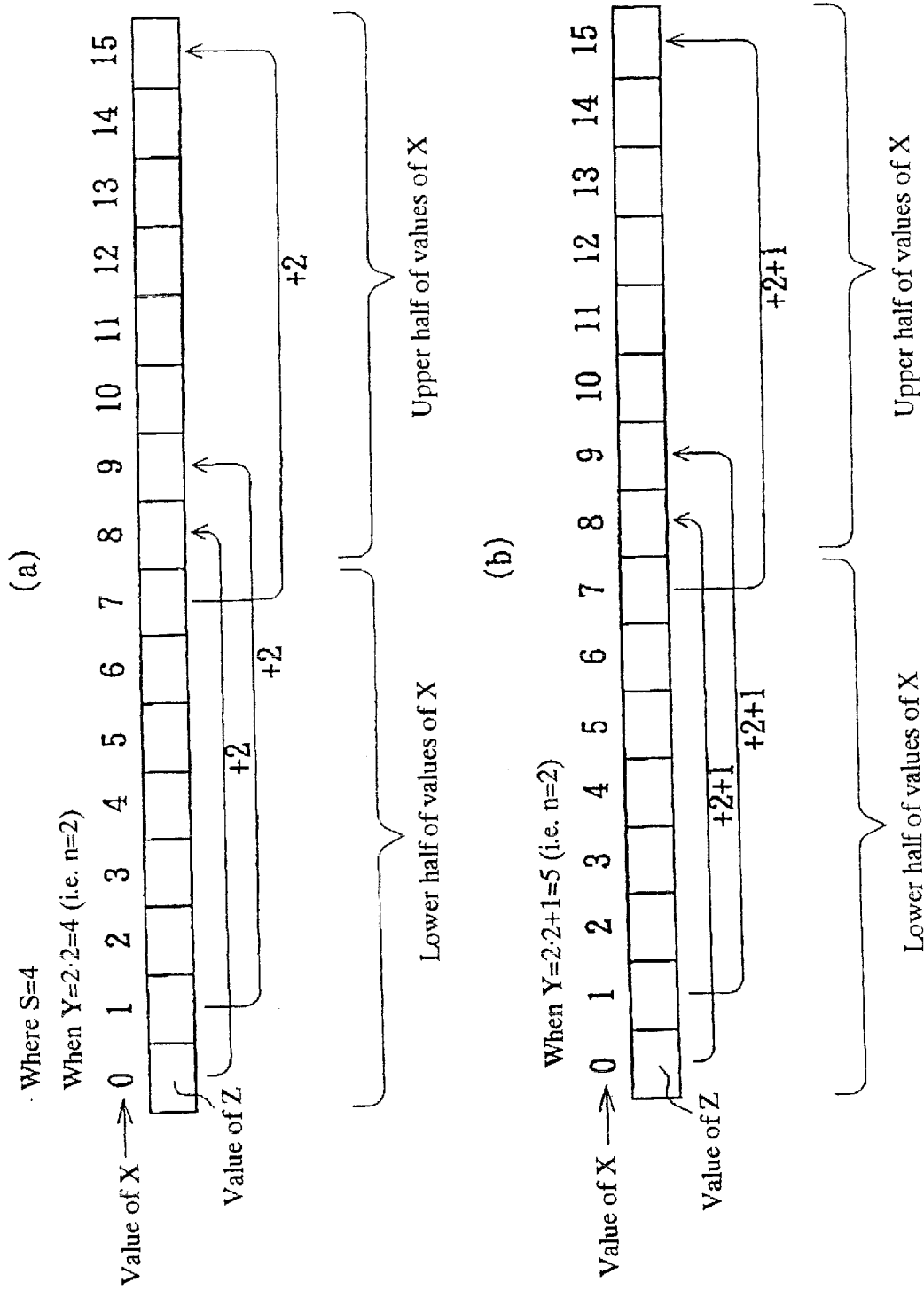

[Figure 4]
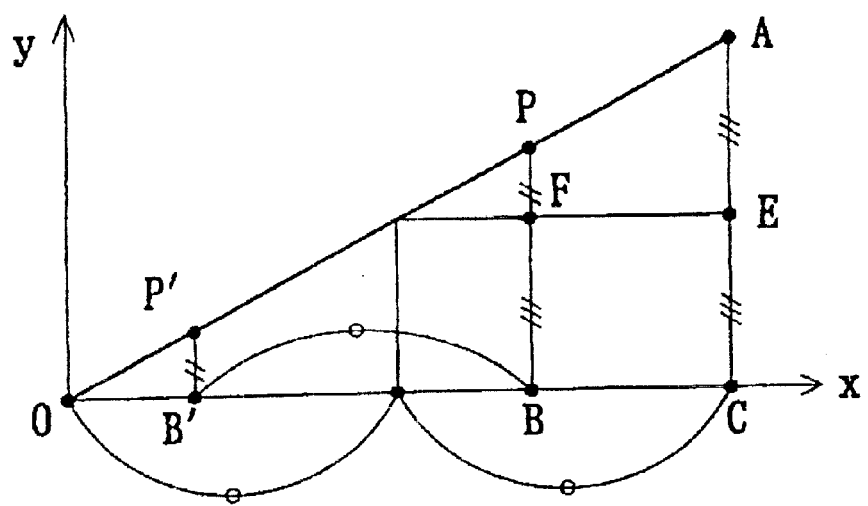

[Figure 5]
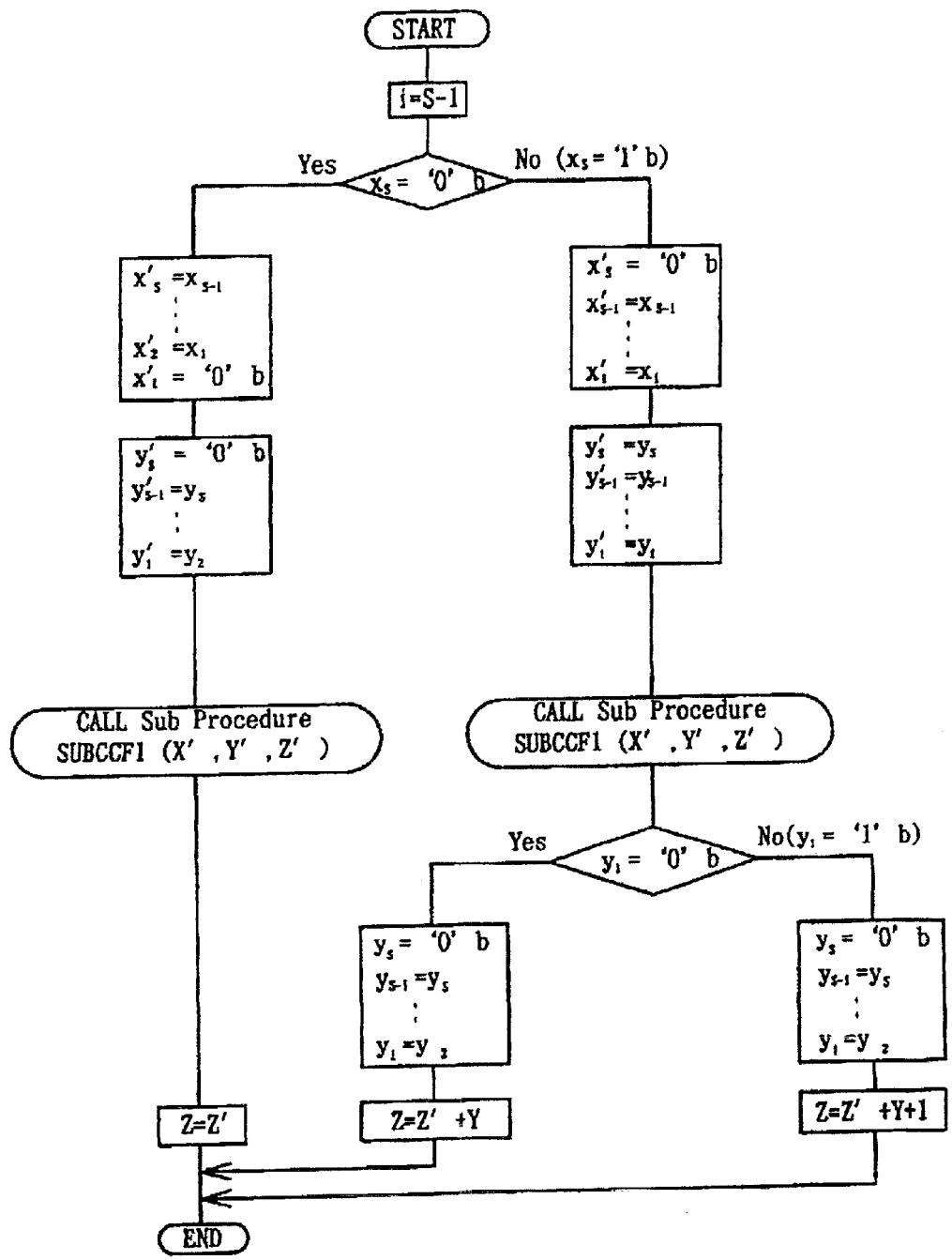

[Figure 6]
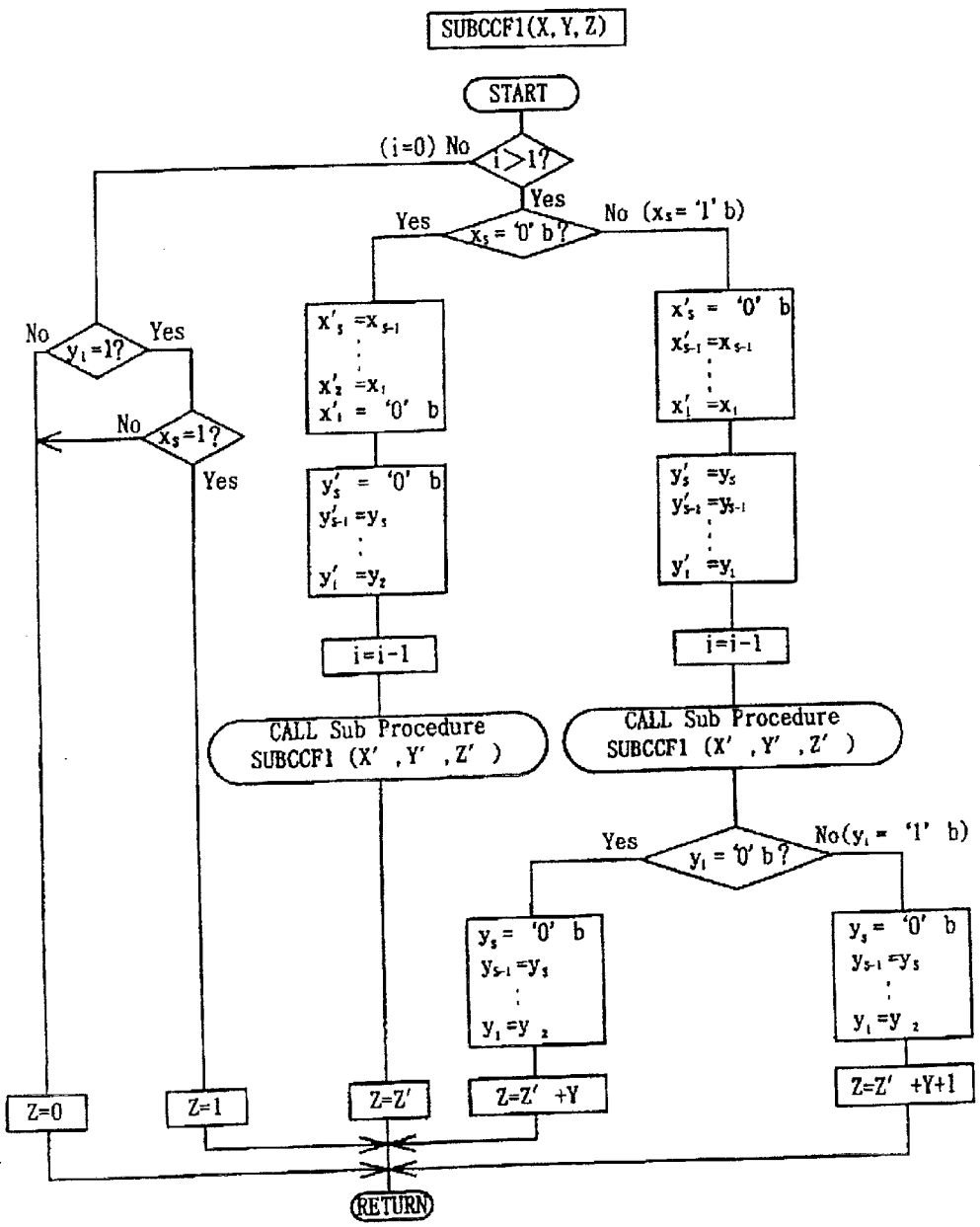

[Figure 7]
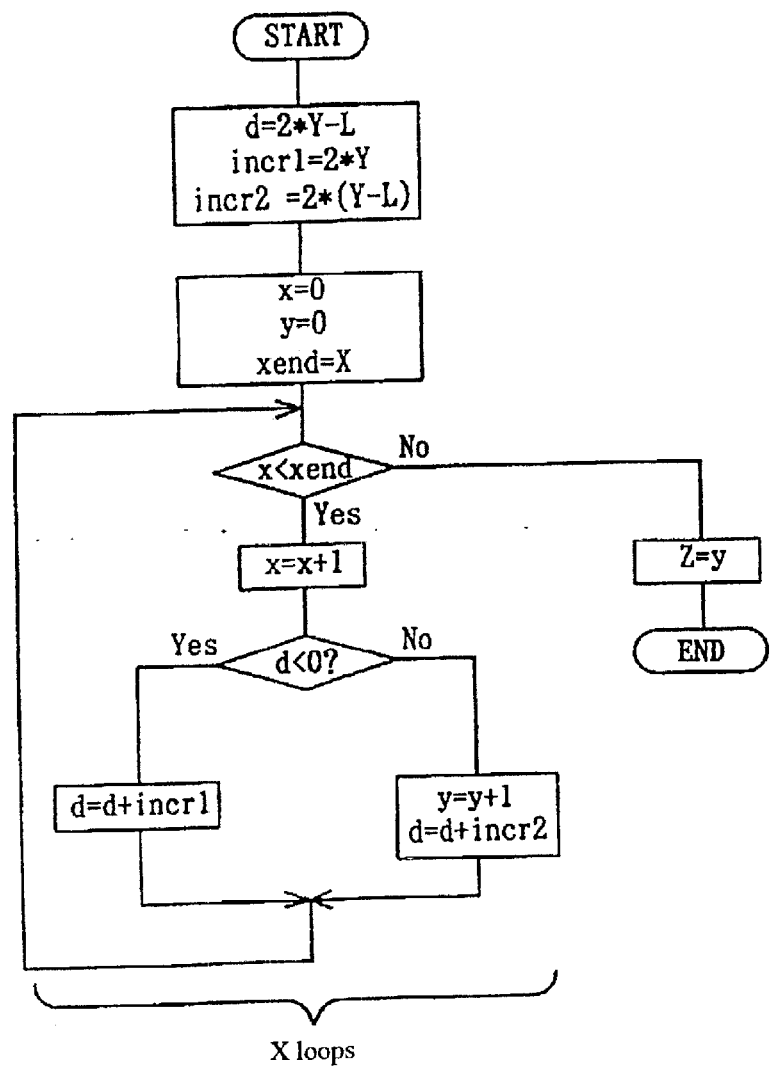

[Figure 8]

| | X= 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 1 | 1 | 1 | 1 | 1 | 1 | 1 | 1 |
| 2 | 0 | 0 | 0 | 0 | 1 | 1 | 1 | 1 | 1 | 1 | 1 | 1 | 2 | 2 | 2 | 2 |
| 3 | 0 | 0 | 0 | 0 | 1 | 1 | 1 | 1 | 2 | 2 | 2 | 2 | 3 | 3 | 3 | 3 |
| 4 | 0 | 0 | 1 | 1 | 1 | 1 | 2 | 2 | 2 | 2 | 3 | 3 | 3 | 3 | 4 | 4 |
| 5 | 0 | 0 | 1 | 1 | 1 | 1 | 2 | 2 | 3 | 3 | 4 | 4 | 4 | 4 | 5 | 5 |
| 6 | 0 | 0 | 1 | 1 | 2 | 2 | 3 | 3 | 3 | 3 | 4 | 4 | 5 | 5 | 6 | 6 |
| 7 | 0 | 0 | 1 | 1 | 2 | 2 | 3 | 3 | 4 | 4 | 5 | 5 | 6 | 6 | 7 | 7 |
| 8 | 0 | 1 | 1 | 2 | 2 | 3 | 3 | 4 | 4 | 5 | 5 | 6 | 6 | 7 | 7 | 8 |
| 9 | 0 | 1 | 1 | 2 | 2 | 3 | 3 | 4 | 5 | 6 | 6 | 7 | 7 | 8 | 8 | 9 |
| 10 | 0 | 1 | 1 | 2 | 3 | 4 | 4 | 5 | 5 | 6 | 6 | 7 | 8 | 9 | 9 | 10 |
| 11 | 0 | 1 | 1 | 2 | 3 | 4 | 4 | 5 | 6 | 7 | 7 | 8 | 9 | 10 | 10 | 11 |
| 12 | 0 | 1 | 2 | 3 | 3 | 4 | 5 | 6 | 6 | 7 | 8 | 9 | 9 | 10 | 11 | 12 |
| 13 | 0 | 1 | 2 | 3 | 3 | 4 | 5 | 6 | 7 | 8 | 9 | 10 | 10 | 11 | 12 | 13 |
| 14 | 0 | 1 | 2 | 3 | 4 | 5 | 6 | 7 | 7 | 8 | 9 | 10 | 11 | 12 | 13 | 14 |
| 15 | 0 | 1 | 2 | 3 | 4 | 5 | 6 | 7 | 8 | 9 | 10 | 11 | 12 | 13 | 14 | 15 |

| Y\X | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 1 | 1 | 1 | 1 | 1 | 1 | 1 | 1 |
| 2 | 0 | 0 | 0 | 0 | 1 | 1 | 1 | 1 | 1 | 1 | 1 | 1 | 2 | 2 | 2 | 2 |
| 3 | 0 | 0 | 0 | 1 | 1 | 1 | 1 | 1 | 2 | 2 | 2 | 2 | 2 | 3 | 3 | 3 |
| 4 | 0 | 0 | 1 | 1 | 1 | 1 | 2 | 2 | 2 | 3 | 3 | 3 | 3 | 3 | 4 | 4 |
| 5 | 0 | 0 | 1 | 1 | 1 | 2 | 2 | 2 | 3 | 3 | 3 | 4 | 4 | 4 | 5 | 5 |
| 6 | 0 | 0 | 1 | 1 | 2 | 2 | 2 | 3 | 3 | 4 | 4 | 4 | 5 | 5 | 6 | 6 |
| 7 | 0 | 0 | 1 | 1 | 2 | 2 | 3 | 3 | 4 | 4 | 5 | 5 | 6 | 6 | 7 | 7 |
| 8 | 0 | 1 | 1 | 2 | 2 | 3 | 3 | 4 | 4 | 5 | 5 | 6 | 6 | 7 | 7 | 8 |
| 9 | 0 | 1 | 1 | 2 | 2 | 3 | 4 | 4 | 5 | 5 | 6 | 7 | 7 | 8 | 8 | 9 |
| 10 | 0 | 1 | 1 | 2 | 3 | 3 | 4 | 5 | 5 | 6 | 7 | 7 | 8 | 9 | 9 | 10 |
| 11 | 0 | 1 | 1 | 2 | 3 | 4 | 4 | 5 | 6 | 7 | 7 | 8 | 9 | 10 | 10 | 11 |
| 12 | 0 | 1 | 2 | 2 | 3 | 4 | 5 | 6 | 6 | 7 | 8 | 9 | 10 | 10 | 11 | 12 |
| 13 | 0 | 1 | 2 | 3 | 3 | 4 | 5 | 6 | 7 | 8 | 9 | 10 | 10 | 11 | 12 | 13 |
| 14 | 0 | 1 | 2 | 3 | 4 | 5 | 6 | 7 | 7 | 8 | 9 | 10 | 11 | 12 | 13 | 14 |
| 15 | 0 | 1 | 2 | 3 | 4 | 5 | 6 | 7 | 8 | 9 | 10 | 11 | 12 | 13 | 14 | 15 |

<<=Z

[Figure 10]
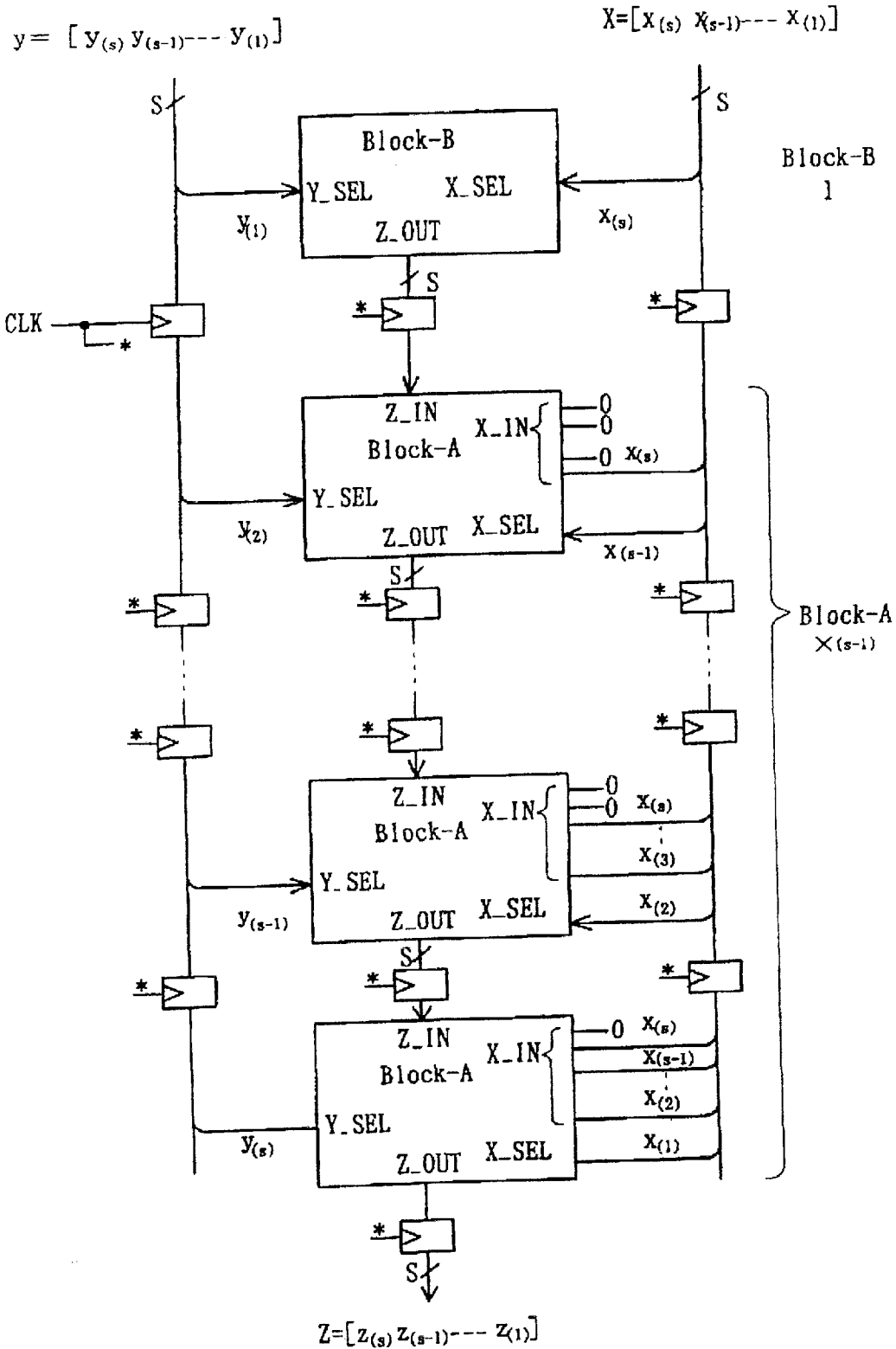

[Figure 11]
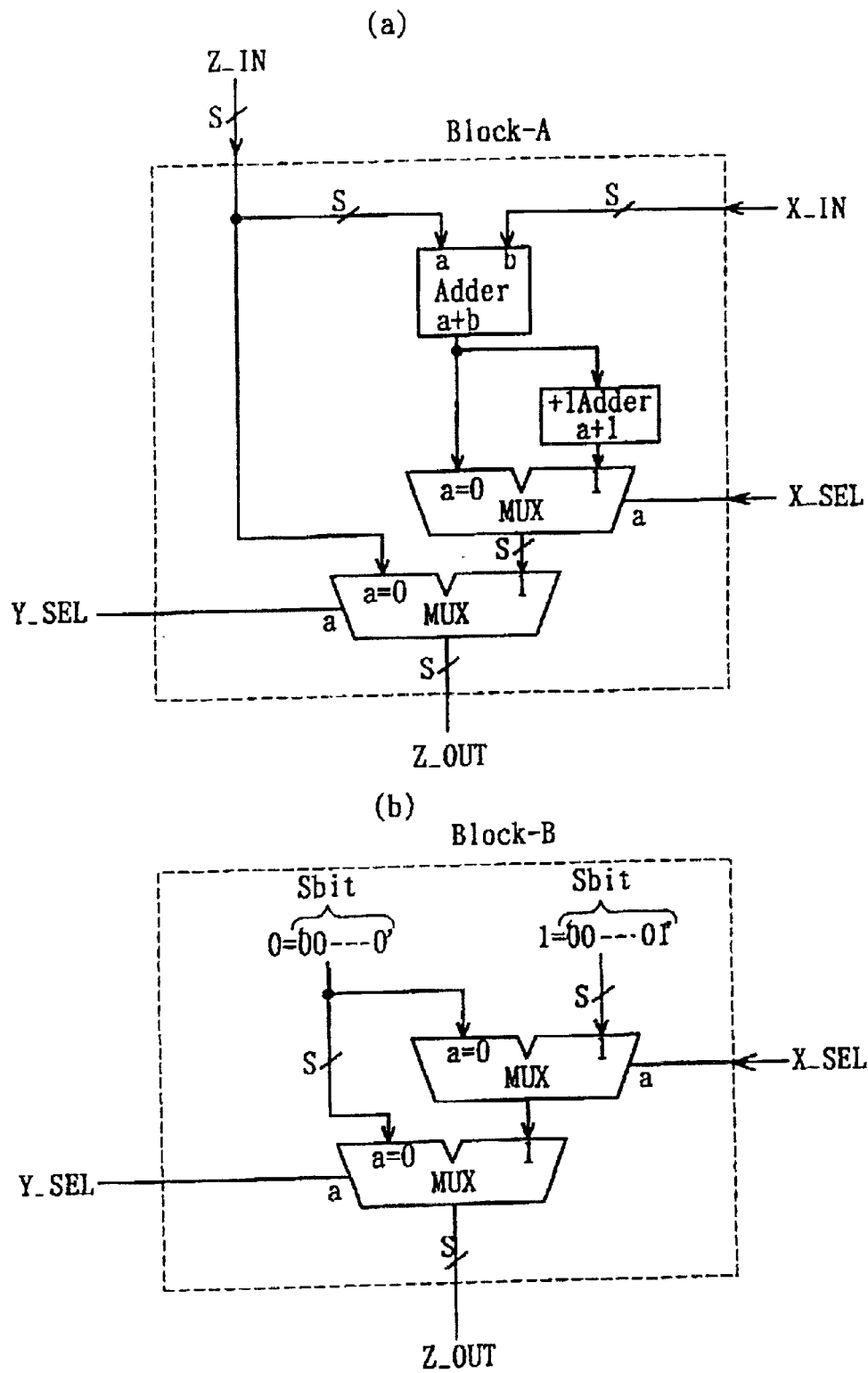

[Figure 12]
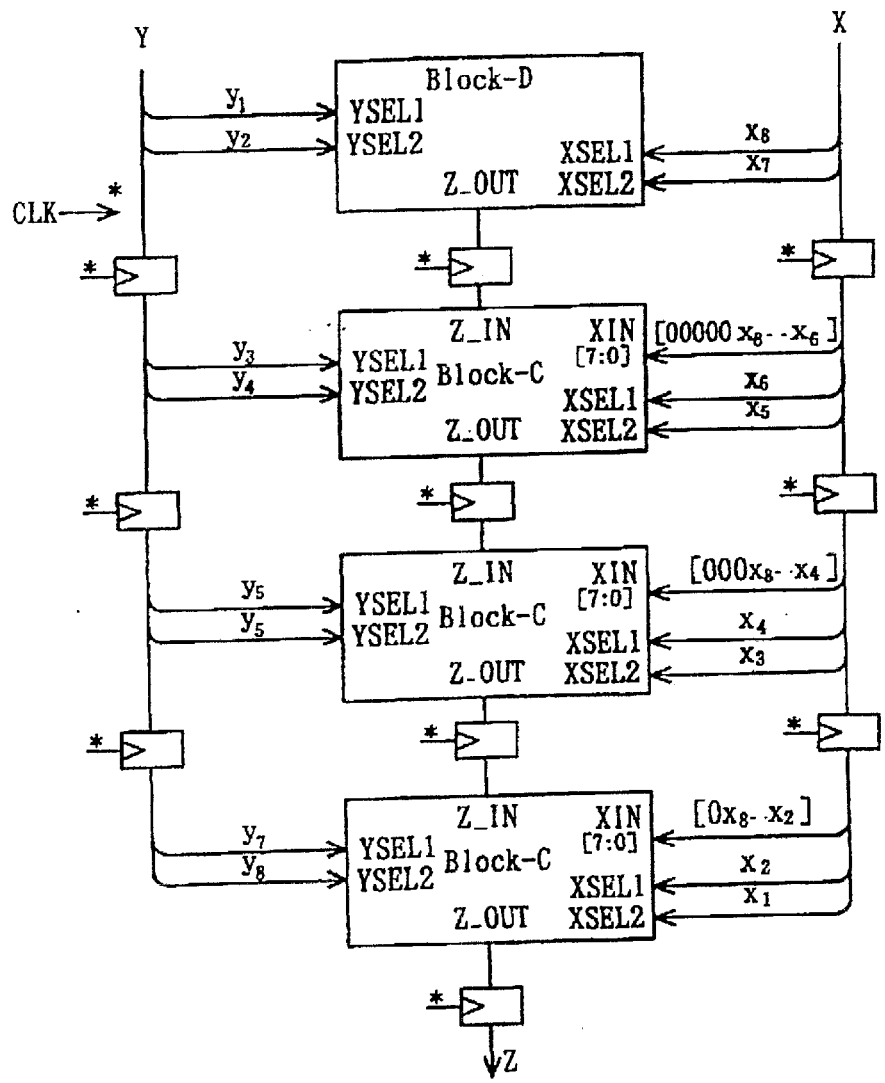

[Figure 13]
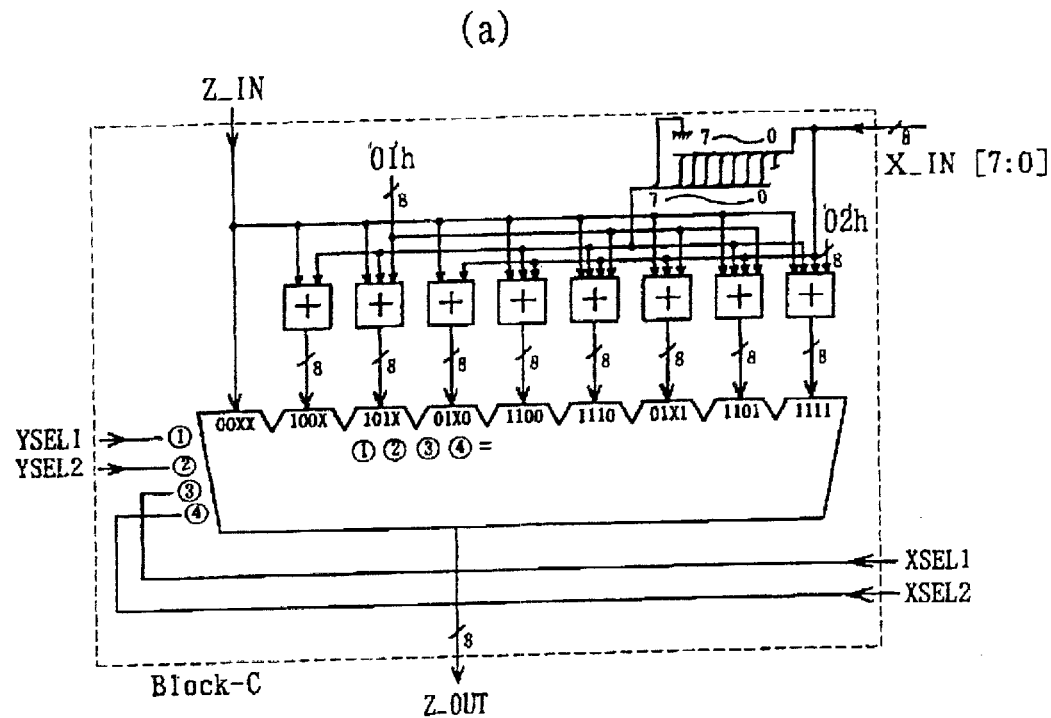
(a)
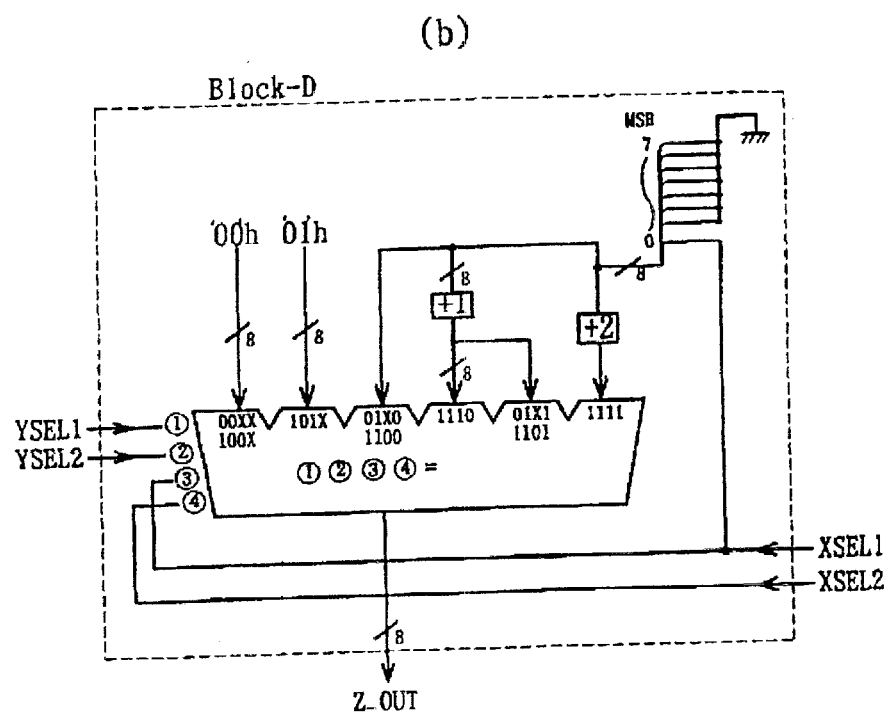
(b)

[Figure 14]
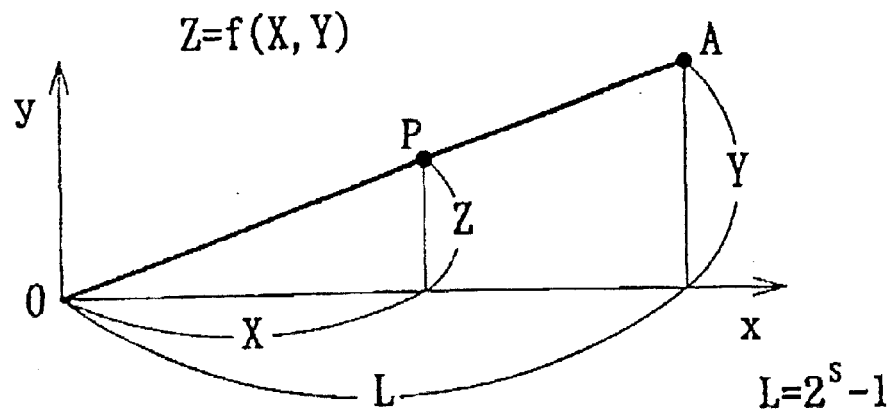
[Figure 15]
(a)
| X | X:Sbit
| Y | Y:Sbit
(b)
M:X·(S+1)bit
↖ Decimal point
(c)
$\dfrac{X \cdot (S+1)}{2^S}$
↖ Decimal point
⇓
Z

[Figure 16]
|   | X = | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 1 | 1 | 1 | 1 | 1 | 1 | 1 | 1 |
| 2 | 0 | 0 | 0 | 0 | 0 | 0 | 1 | 1 | 1 | 1 | 1 | 2 | 2 | 2 | 2 | 2 |
| 3 | 0 | 0 | 0 | 0 | 1 | 1 | 1 | 1 | 2 | 2 | 2 | 2 | 3 | 3 | 3 | 3 |
| 4 | 0 | 0 | 0 | 0 | 1 | 1 | 1 | 2 | 2 | 2 | 3 | 3 | 3 | 4 | 4 | 4 |
| 5 | 0 | 0 | 0 | 1 | 1 | 1 | 2 | 2 | 3 | 3 | 3 | 4 | 4 | 4 | 5 | 5 |
| 6 | 0 | 0 | 0 | 1 | 1 | 2 | 2 | 3 | 3 | 3 | 4 | 4 | 5 | 5 | 6 | 6 |
| 7 | 0 | 0 | 1 | 1 | 2 | 2 | 3 | 3 | 4 | 4 | 5 | 5 | 6 | 6 | 7 | 7 |
| 8 | 0 | 0 | 1 | 1 | 2 | 2 | 3 | 3 | 4 | 5 | 5 | 6 | 6 | 7 | 7 | 8 |
| 9 | 0 | 0 | 1 | 1 | 2 | 3 | 3 | 4 | 5 | 5 | 6 | 6 | 7 | 8 | 8 | 9 |
| 10 | 0 | 0 | 1 | 2 | 2 | 3 | 4 | 4 | 5 | 6 | 6 | 7 | 8 | 8 | 9 | 10 |
| 11 | 0 | 0 | 1 | 2 | 3 | 3 | 4 | 5 | 6 | 6 | 7 | 8 | 8 | 9 | 10 | 11 |
| 12 | 0 | 0 | 1 | 2 | 3 | 4 | 4 | 5 | 6 | 7 | 8 | 8 | 9 | 10 | 11 | 12 |
| 13 | 0 | 0 | 1 | 2 | 3 | 4 | 5 | 6 | 7 | 7 | 8 | 9 | 10 | 11 | 12 | 13 |
| 14 | 0 | 0 | 1 | 2 | 3 | 4 | 5 | 6 | 7 | 8 | 9 | 10 | 11 | 12 | 13 | 14 |
| 15 | 0 | 1 | 2 | 3 | 4 | 5 | 6 | 7 | 8 | 9 | 10 | 11 | 12 | 13 | 14 | 15 |
<<= Z
: Smaller by 1 than in the case of Bresenham
 : Larger by 1 than in the case of Bresenham
(Color photo)

[Figure 17]
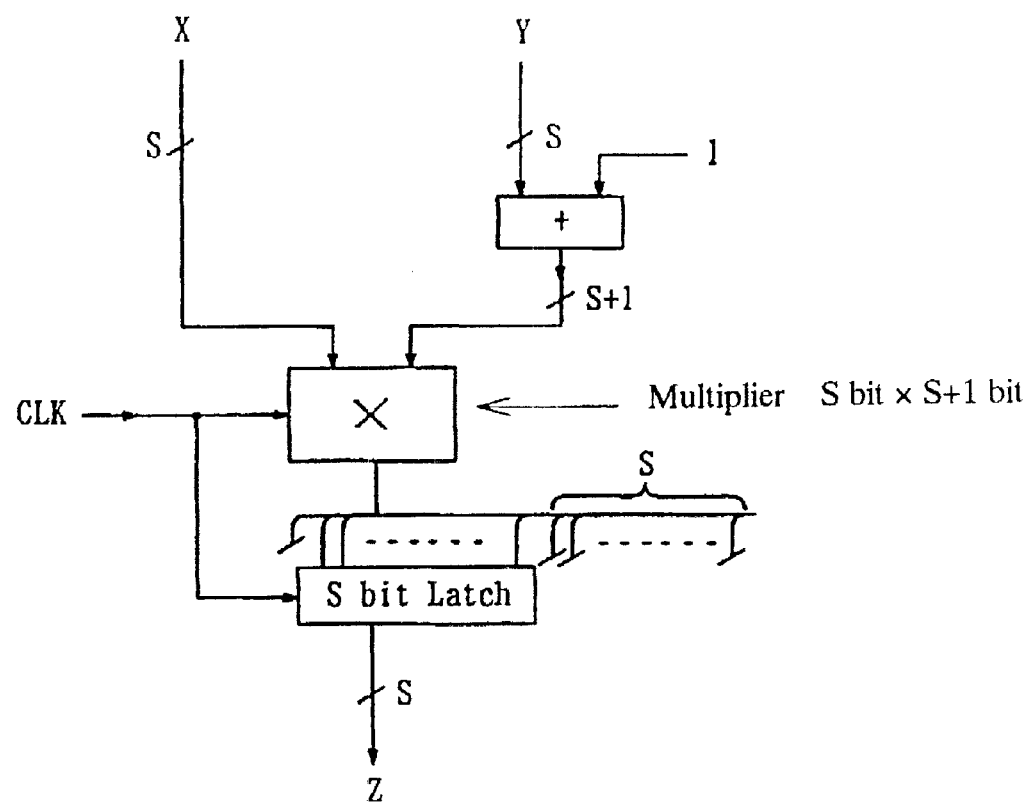

[Figure 18]
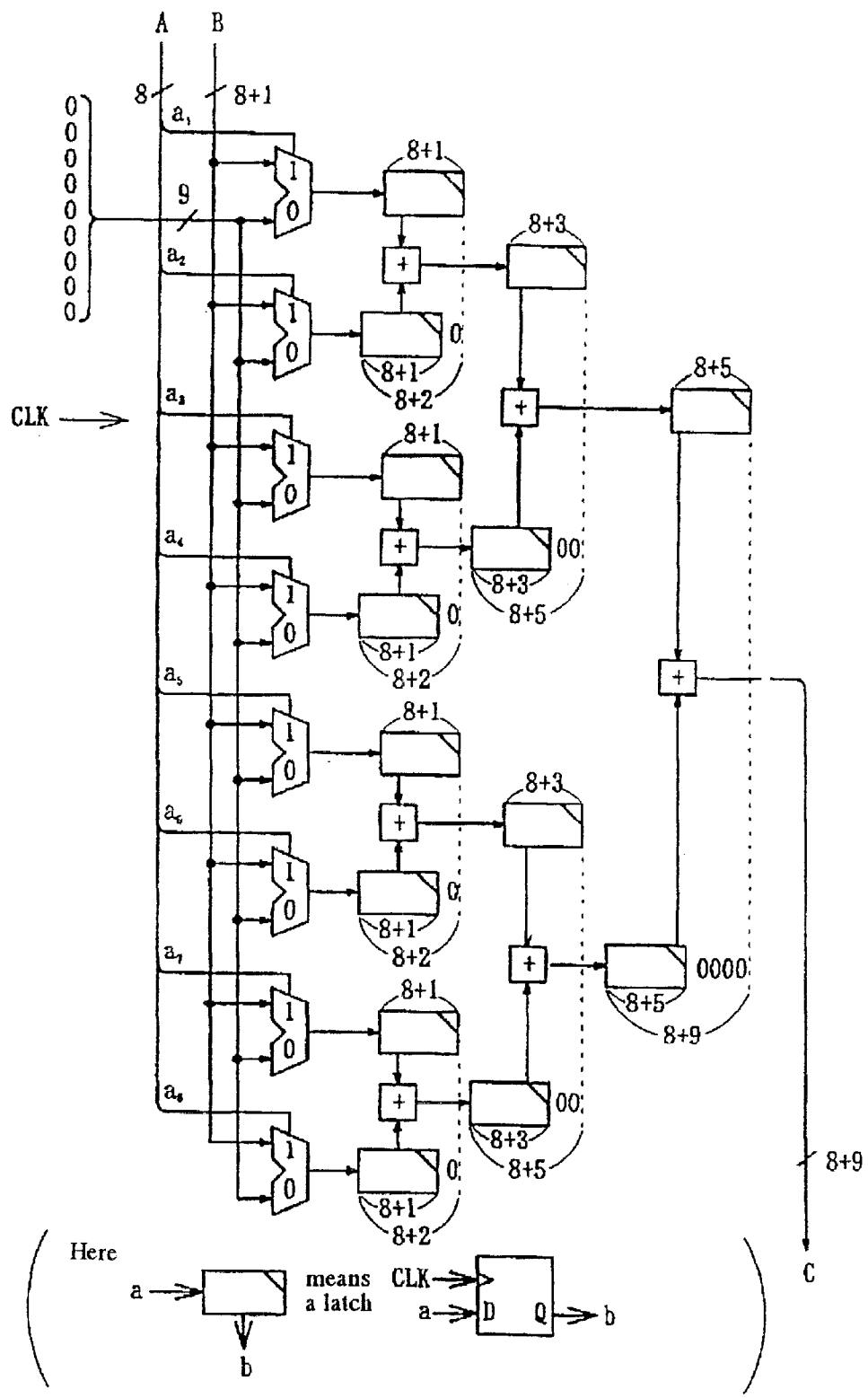

[Figure 19]
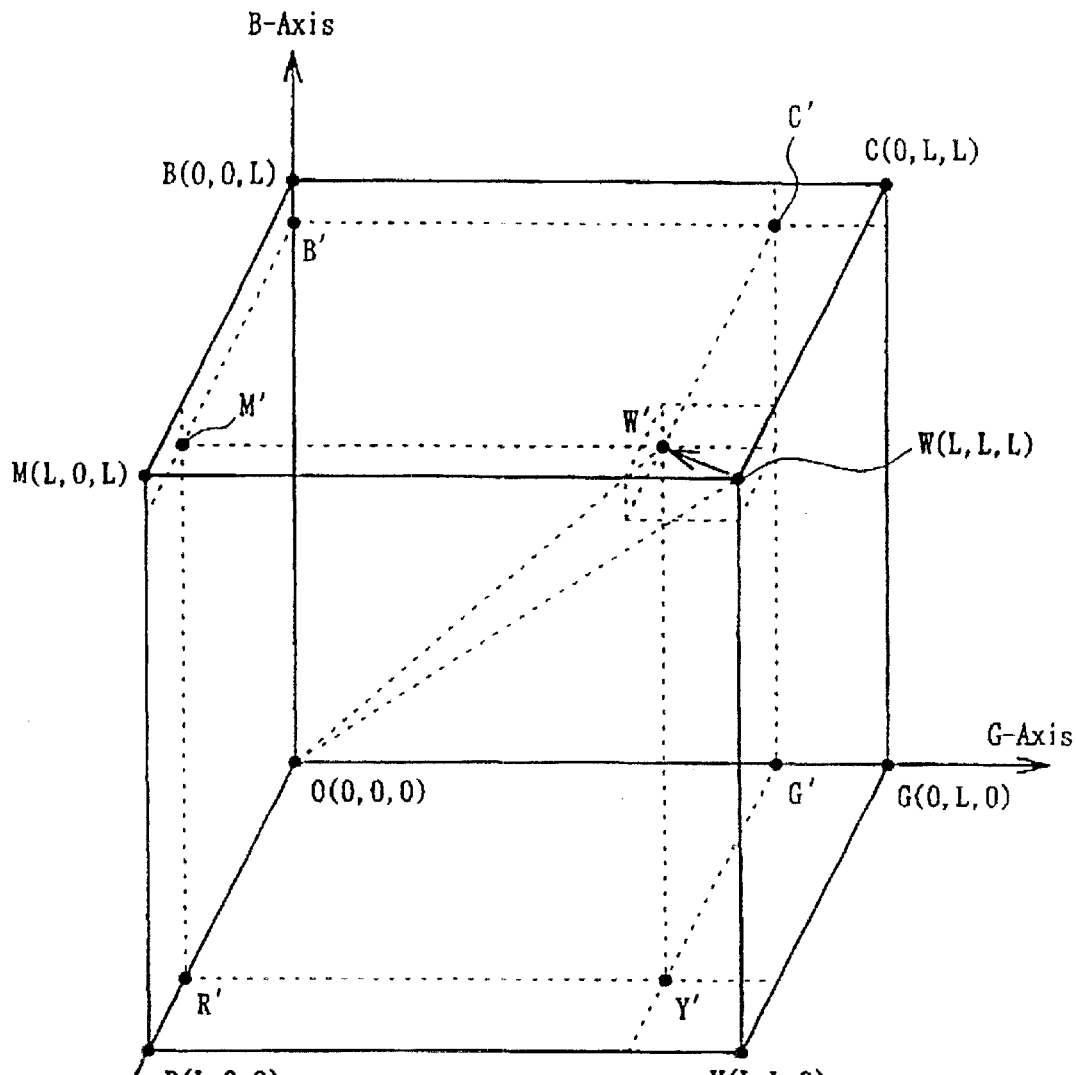

METHOD OF CONVERTING A LINEAR VALUE TO AN INTEGER

FIELD OF THE INVENTION

The present invention relates to a method of converting a linear value to an integer, and more particularly to a method of converting a linear value to an integer that can be suitably used for controlling the white balance in a digital color display unit or the like.

RELATED ART

Conventionally, in the field of raster graphics and the like, methods of converting a linear value to an integer by scan-converting the linear value to calculate the integer equivalent of the linear value have been used. As one such method of converting a linear value to an integer, Bressenham's algorithm is known. According tot his algorithm, the y coordinate of the integral lattice point group closest in the y directional distance to a line segment OA connecting the origin O(0,0) to point A(0,L) in an xy coordinate system can be obtained such as illustrated in FIG. 1, for instance. This algorithm, ideal in respect to approximation of line segments, has been extensively used to date as an algorithm for use in drawing line segments on a raster scanning type display unit.

Supposing that the number of data bits in a given digital data processing system is S, the largest number that can be expressed in these data is $2^s-1$. If, for instance in a digital color display system, S bits each are allocated as data representing the three primary colors including R (red), G (green) and B (blue), each color can take $2^s$ different sets of data, from 0 (the smallest) to $2^s-1$ (the largest). In this procedure, it is often required to find out on a real time basis a value Z that can be expressed in these data bits from another value Y by proportional calculation. Thus, $Z=Y \cdot a$, where $a=X/(2^s-1)$ and X, Y and Z are all S bit binary numbers. This is nothing but a case in which Z is figured out according to FIG. 1 with $L=2^s-1$ being given. Bresenham's algorithm is also applicable to 1 or any larger integral value as L. However, as this algorithm, in FIG. 1 for example, starts from either the origin O or point A and calculates the y coordinate of the adjoining lattice point at each step, the number of steps depends on the value of the input X. For instance if calculation is started from the origin O, the number of steps required for-figuring out the y coordinate when $X=2^s-1$ will be in an order proportional to $2^s-1$. Thus the number of steps required for calculation by Bresenham's algorithm is, at its worst, in an order proportional to $2^s-1$ (denoted $O(2^s)$) In consequence, to take up S=8 as an example, a maximum of 255 steps of calculation will be needed to find out the value of a single point, resulting in the problem that such a way of calculation is impractical.

SUMMARY OF THE INVENTION

An object of the present invention is to obviate the above-described problem and provide a method of converting a linear value to an integer, which permits efficient calculation of the integer equivalent of a linear value.

According to a method of converting a linear value to an integer of the invention, the y coordinate value Z of point P having an x coordinate value X is calculated in accordance with a core calculation function: f(X,Y); said point P, one of integral lattice points, being located in the vicinity of side OA of a triangle OAB consisting of the origin O (0,0), point A (L,Y), point B (L,0):

$$Z=f(X,Y)$$

wherein $0 \leq X \leq L$, $0 \leq Y \leq L$, X,Y: integers
$L=2^s-1$, $S \geq 1$, S: an integer
f(X,Y) satisfies all the conditions below,
i) f(0,0)=0, and f(L,Y)=Y for arbitrary Y
ii) for arbitrary $0 \leq X < L$ and arbitrary Y $$f(X+1,Y)=f(X,Y)+0$$

or $f(X+1,Y)=f(X,Y)+1$ iii) for arbitrary $0 \leq Y < L$ and arbitrary X $$f(X,Y+1)=f(X,Y)+0$$

or $f(X,Y+1)=f(X,Y)+1$ iv) an output Z is obtained without exception after a constant numbers of operating steps for arbitrary inputs X and Y.

According to the invention, it is possible to figure out the integer equivalent of a linear value by a certain number of steps of calculation substantially smaller than according to the prior art and efficiently calculate the integer equivalent of a linear value by defining a core calculation function (f) and calculating the integer equivalent of a linear value in accordance with the defined core calculation function (f).

BRIEF DESCRIPTION OF THE DRAWINGS

FIG. 1 is a diagram for illustrating the underlying assumptions of the method of converting a linear value to an integer according to the present invention.

FIGS. 2(a) through (c) are diagrams for explaining the core calculation function for use in Method 1 according tot he invention.

FIGS. 3(a) and (b), like FIGS. 2(a) through (c), are diagrams for explaining the core calculation function for use in Method 1 according to the invention.

FIG. 4, like FIG. 2 and 3, is a diagram for explaining the core calculation function for use in Method 1 according to the invention.

FIG. 5 is a diagram showing an example of flow chart of an actual case in which the integer equivalent of a linear value is calculated in accordance with Method 1 of the invention.

FIG. 6 is a diagram showing an example of flow chart of a sub-procedure for use in FIG. 5.

FIG. 7 is a diagram showing an example of flow chart of a case of calculating the integer equivalent of a linear value in accordance with Bresenham's algorithm.

FIG. 8 is a diagram showing the result of calculating the values of Z for different combinations of X and Y in accordance with Method 1 of the invention.

FIG. 9 is a diagram showing the result of calculating the values of Z for different combinations of X and Y in accordance with Bresenham's algorithm.

FIG. 10 is a block diagram illustrating an example of overall configuration where Method 1 of the invention is composed of a logic circuit.

FIGS. 11(a) and (b) are diagrams for explaining details of Block-A and Block-B in FIG. 10.

FIG. 12 is a block diagram showing a case in which every two stages are put together into a single stage to compose a four stage pipeline where S=8.

FIGS. 13(a) and (b) are diagrams for explaining details of Block-A and Block-B in FIG. 12.

FIG. 14 is a diagram for explaining the concept of Method 2 according to the invention.

FIGS. 15(a) through (c) are diagrams for explaining how the integer equivalent of a linear value is calculated in accordance with Method 2 of the invention.

FIG. 16 is a diagram showing the result of calculating the values of Z for different combinations of X and Y in accordance with Method 2 of the invention.

FIG. 17 is a block diagram illustrating an example of overall configuration where Method 2 of the invention is composed of a logic circuit.

FIG. 18 is a block diagram showing an example of configuration of the multiplier in FIG. 17.

FIG. 19 is a diagram for explaining an example of control of white points in a three-dimensional space formed by R-G-B orthogonal coordinate axes.

DESCRIPTION OF THE PREFERRED EMBODIMENT

FIG. 1 is a diagram illustrating the underlying assumptions of the method of converting a linear value to an integer according to the present invention. A triangle OAB consisting of the origin O (0,0), point A (L,Y) and point B (L,0) in the xy coordinate system shown in FIG. 1 is considered. Here $L=2^s-1$, $S \geq 1$, S is an integer, $0 \leq X \leq L$ and $0 \leq Y \leq L$, and supposing for instance that the number of bits of data in a digital data processing system is S, $L=2^s-1$ represents the largest number that can be expressed by the data. And, out of the integral lattice points positioned in the vicinity of side OA, the y coordinate Z of point P whose x coordinate is X is calculated by using a core calculation function $Z=f(X,Y)$. Incidentally, because of the relationships of $0 \leq X \leq L$ and $0 \leq Y \leq L$, side OA in FIG. 1 automatically deals with the range between 0° and 45°.

Thus, the present invention is characterized in that it calculates the integer equivalent of a linear value by using a core calculation function $Z=f(X,Y)$ presented below instead of Bresenham's algorithm known to those skilled in the art. Here the core calculation function (f) is as follows:

$$Z=f(X,Y)$$

wherein $0 \leq X \leq L$, $0 \leq Y \leq L$, X,Y: integers
$L=2^s-1$, $S \geq 1$, S: an integer
f(X,Y) satisfies all the conditions below,
i) f(0,0)=0, and f(L,Y)=Y for arbitrary Y
ii) For arbitrary $0 \leq X < L$ and arbitrary Y $$f(X+1,Y)=f(X,Y)+0$$

or $f(X+1,Y)=f(X,Y)+1$ iii) For arbitrary $0 \leq Y < L$ and arbitrary X $$f(X,Y+1)=f(X,Y)+0$$

or $f(X,Y+1)=f(X,Y)+1$ iv) an output Z is obtained without exception after the constant numbers of operating steps for arbitrary inputs X and Y (for inputs X and Y, Z is outputted in a pipeline manner).

To add, as is self-evident from i) through iii), for arbitrary X the following holds:

$$f(X,0)=0$$

$$f(X,L)=X$$

The above-explained core calculation function, $Z=f(X,Y)$, is described in a graphic way with reference to FIG. 1 as follows. There is a group of integral lattice points monotonically increasing from point O to point A, and the difference of any one point from another adjoining point on the right side in y coordinate is at most 1. In addition, in the case when the y coordinate of point A is increased by one, an increase of each point in y coordinate is at most 1. This is a function to calculate in this situation the y coordinate Z of point P whose x coordinate is X out of the aforesaid group of integral lattice points with respect to arbitrary inputs X and Y (where $0 \leq X \leq L$, $0 \leq Y \leq L$, X,Y: integers).

Next will be described a method of actually calculating the integer equivalent of a linear value by using the above-described core calculation function. The invention selectively uses one or the other of the following two methods as the occasion demands. The methods of actually calculating the integer equivalent of a linear value by using the core calculation function will be described below one after the other.

Method 1:

The integer equivalent of a linear value is calculated by the following steps [1] through [4]. As shown in FIGS. 2(a) through (c) and FIGS. 3(a) and (b), where S=4, in the core calculation function $Z=f(X, Y)$,

[1] when Y=0, Z=0 without exception irrespective of the value of X (FIG. 2(a));

[2] when Y=1, Z=0 if the value of X is in the lower half or Z=1 if the value of X is in the upper half (FIG. 2(b));

[3] the value of Z when Y=2n, X=m or Y=2n+1, X=m (n, m: integers, the value of m being in the lower half) is equal to the value of Z when Y=n, X=2m. Namely, the geometrical property that OB=2·OB' when CA'=2·CA in FIG. 2(c) is utilized. This makes it possible to substitute, when the value of Y is in the upper half, the calculation of the value of Z when the value of Y is a certain value in the lower half and the value of X is twofold if the value of X is in the lower half.

[4] At the same value of Y, the value of Z when the value of X is in the upper half is obtained from the value of Z when the value of X is in the lower half in such a manner that: when Y=2n (n: an integer), $$Z=f(X,Y)$$

takes the same value as f(X',Y)+n, and
when Y=2n+1, $$Z=f(X,Y)$$

takes the same value as f(X',Y)+n+1,
wherein X' is a value resulting from the alteration of the MSB (most significant bit) of X (an S bit binary number) from 1 to 0. A case of Y=2n(n=2) is shown in FIG. 3(a), and one of Y=2n+1 (n=2), in FIG. 3(b). This utilizes the geometrical property that, in FIG. 4, if AE=EC, BP=PF+FB=P'B'+EC. It is thereby made possible to obtain the value of Z when the value of X is in the upper half, by simple addition, from the value of Z when the value of X is in the lower half in every case where the value of Y is the same. Thus, the value of Z in every combination of Y≧2 can eventually be figured out from the value of Z when Y=1.

FIG. 5 shows an example of flow chart of an actual case in which the integer equivalent of a linear value is calculated in accordance with the above-described Method 1 of the present invention, and FIG. 6 shows an example of flow chart of a sub-procedure for use in FIG. 5. The flow charts shown in FIGS. 5 and 6 are expressed with the following conditions being supposed. Thus the following expressions are used.

X being an S bit binary number, $$X=[x_S\ x_{S-1}\ \ldots\ x_1]$$

(where each of $x_S, x_{S-1}, \ldots x_1$ is either '0'b or '1'b)
Y being an S bit binary number, $$Y=[y_S\ y_{S-1}\ \ldots\ y_1]$$

(where each of $y_S, y_{S-1}, \ldots y_1$ is either '0'b or '1'b)
Z being an S bit binary number, $$Z=[z_S\ z_{S-1}\ \ldots\ z_1]$$

(where each of $z_S, z_{S-1} \ldots z_1$ is either '0'b or '1'b)
If, for example, X is an 8 bit binary number, it is expressed as X=[11011011] or the like. Similarly, $$X'[x'_S\ x'_{S-1}\ \ldots\ x'_1]$$

(where each of $x'_S, x'_{S-1} \ldots x'_1$ is either '0'b or '1'b)

$$Y'[y'_s\ Y'_{s-1}\ \ldots\ y'_1]$$

(where each of $y'_s, y'_{s-1}, \ldots y'_1$ is either '0'b or '1'b)

$$Z'=[z'_s\ z'_{s-1}\ \ldots\ z'_1]$$

(where each of $z'_s, z'_{s-1}, \ldots z'_1$ is either '0'b or '1'b) are defined in S bit binary numbers.

Further, i is a so-called global variation common to both the main procedure and the sub-procedure.

FIG. 7 shows an example of flow chart of a case of calculating the integer equivalent of a linear value in accordance with Bresenham's algorithm presented for supplementary reference. Comparison of the flow charts shown in FIGS. 5 and 6 following Method 1 of the present invention with the flow chart shown in FIG. 7 following Bresenham's algorithm reveals that, while the sub-procedure is called S−1 times by Method 1 according to the invention, Bresenham's algorithm requires X (i.e. $2^s-1$ at the maximum) loops to calculate an integer. Thus while Z can be calculated in a number of steps proportional to S without depending on the values of X and Y by Method 1 of the invention, Bresenham's algorithm requires a number of steps proportional to X, the value of which varies every time.

The result of calculating the value of Z for each combination of X and Y by the above-described Method 1 where S=4 (i.e. $L=2^s-1=15$) is shown in FIG. 8, and the result of calculating, where also S=4, the value of Z for each combination of X and Y in accordance with Bresenham's algorithm is shown in FIG. 9. Comparison of the result obtained by Method 1 of the invention, shown in FIG. 8, and the result obtained by Bresenham's algorithm, shown in FIG. 9 reveals little difference, demonstrating that Method 1 of the invention can give substantially the same result as Bresenham's algorithm.

Next, there will be described an example of the above-described Method 1 of the present invention composed of a logic circuit. FIG. 10 is a block diagram illustrating an example of overall configuration where Method 1 of the invention is composed of a logic circuit. In the example shown in FIG. 10, $X=[x_s\ x_{s-1}\ \ldots\ x_1]$ and $Y=[y_s\ y_{s-1}\ \ldots\ y_1]$ are consecutively inputted in synchronism with clocks (CLK), and after the completion of S operating steps (S clock periods) $Z=[z_s\ z_{s-1}\ \ldots\ z_1]$ is outputted in a pipeline manner. Details of Block-A and Block-B in FIG. 10 are shown in FIG. 11(a) and (b), respectively. Further, although the example shown in FIG. 10 is composed of an S stage pipeline, the number of stages of the pipeline can be reduced depending on the relationship between the signal propagation delay and clock period of Block-A and Block-B. For instance, it is also possible, where S=8, to put together every two stages into a single stage and thereby compose a four stage pipeline, of which the overall configuration is shown in FIG. 12 and details of Block-C and Block-D in FIG. 12 are illustrated in FIGS. 13(a) and (b).

Method 2:

The integer equivalent of a linear value is calculated by the following steps [1] through [4]. Thus in the core calculation function Z=f(X,Y),

[1] X and Y are S bit inputs,
[2] Y+1=Y' . . . an (S+1) bit binary number,
[3] X·(Y+1)=M . . . a (2S+1) bit binary number, and
[4] S bits from the second most significant bit to the (S+1)th bit of M constitute Z.

The above-cited Method 2 utilizes the geometrical relationship of Z=Y·(X/L) =(X·Y)/L in FIG. 14. As a calculation to divide X·Y by $L=2^s-1$ here would be troublesome, division by $2^s$ is considered instead. Since X and Y are binary numbers, this can be accomplished by shifting the decimal point of the result of X·Y leftward by S bits (the decimal fraction is either discarded or rounded). As there will be a difference from the result of division by $2^s-1$ (for instance it may fail to satisfy Definition i) of the core calculation function), contrivance is made to compensate for this difference to satisfy Definitions i) through iii) of the core calculation function. Specifically, any case in which the value of Z is not at first 0 or not Y at the end is adjusted. More specific expressions of this are the above presented steps [1] through [4].

To describe individual steps, first at step [1], S bits of binary numbers X and Y are inputted as shown in FIG. 15(a). Next at step [2], 1 is added to Y to obtain an (S+1) bit binary number Y'. The addition of 1 here finally satisfies all the definitions of the core calculation function. Then at step [3], X·(Y+1) is calculated to obtain a (2S+1) bit binary number M. This M has a decimal at its right end as shown in FIG. 15(b). Next at step [4], S bits from the second most significant bit to the (S+1)th bit of M are obtained as Z. This is because, as shown in FIG. 15(c), division of M by $2^s$ shifts the decimal point to between the (S+1)th most significant and the (S+2)th bits and, as the respective maxima of X and Y+1 are $2-1$ and $2^s$, the MSB of the 2S+1 bit binary number X·(Y+1) is without exception 0, resulting in the presence of Z within the above-mentioned range.

The result of calculating the value of Z for each combination of X and Y by the above-described Method 2 where S=4 (i.e. $L=2^s-1=15$) is shown in FIG. 16. Comparison of the result obtained by Method 2 of the invention, shown in FIG. 16, and the aforementioned result obtained by Bresenham's algorithm, shown in FIG. 9, reveals little difference, demonstrating that Method 2 of the invention can give substantially the same result as Bresenham's algorithm. Further, comparison with the result obtained by Method 1 of the invention, shown in FIG. 8, reveals that the position which is inconsistency with the result obtained by Bresenham's algorithm differs between Methods 1 and 2.

Next will be described an example of the above-described Method 2 of the present invention composed of a logic circuit. FIG. 17 is a block diagram illustrating an example of overall configuration where Method 2 of the invention is composed of a logic circuit. In the example shown in FIG. 17, too, $X=[x_s \ x_{s-1} \ ... \ x_1]$ and $Y=[y_s \ y_{s-1} \ ... \ y_1]$ are consecutively inputted in synchronism with clocks (CLK), and after the completion of a certain number of operating steps ($S_M+1$ clock periods, where $S_M$ is the number of clocks required by a multiplier) $Z=[z_s \ z_{s-1} \ ... \ z_1]$ is outputted in a pipeline manner. The configuration of the multiplier in FIG. 17 is complex but known. An example of configuration of the multiplier where S=8 is shown in FIG. 18.

Control of white points to which the above-described method of converting a linear value to an integer according to the present invention is applied will be explained. Now, a color display unit or the like is considered wherein color data of R (red), G (green) and B (blue) are processed with S bit digital values Rdi, Gdi and Bdi (where $0 \leq Rdi, Gdi, Bdi \leq L = 2^s - 1$, Rdi, Gdi and Bdi are integers). To consider points where these values Rdi, Gdi and Bdi take on R, G and B coordinate values ("integral lattice points" as they are integers) in a three-dimensional space formed by the R-G-B orthogonal coordinate axes shown in FIG. 19, any arbitrary color can be matched with some of all the integral lattice points (totaling $(L+1)^3$) on and within the surfaces of the cube OBMR-GCWY of FIG. 19. Point W represents the color where R, G and B are all at their highest gradation values L, i.e. white of the maximum brightness, and the integral lattice points on line segment OW represent achromatic colors (so-called gray) of L+1 gradations from black (point O) to white (point W). Here white point control may be realized by converting white (point W) to point W'. Other colors than white are also converted correspondingly; i.e. the colors expressed by using all the integral lattice points (totaling $(L+1)^3$) on and within the surfaces of the cube OBMR-GCWY of FIG. 19 are converted so as to be represented by only the colors on and within the surfaces of the cube OB'M'R'-G'C'W'Y'. The conversion formulas in this case can be expressed as follows, with unconverted colors being represented by Rdi, Gdi and Bdi, and converted colors, by Rdo, Gdo and Bdo:

$$Rdo = Rdi - Rt$$

$$Gdo = Gdi - Gt$$

$$Bdo = Bdi - Bt$$

where $$Rt = f(Rdi, Rtm)(0 \leq Rt \leq Rtm)$$

$$Gt = f(Gdi, Gtm)(0 \leq Gt \leq Gtm)$$

$$Bt = f(Bdi, Btm)(0 \leq Bt \leq Btm)$$

$$Rtm = L - L'_R$$

$$Gtm = L - L'_G$$

$$Btm = L - L'_B$$

In the above-described example, the core calculation function according to the present invention can be used in calculating Rt, Gt and Bt by supposing Z=f(X,Y).

As is evident from the foregoing description, according to the present invention, since a core calculation function (f) is defined and the integer equivalent of a linear value is calculated in accordance with the defined core calculation function (f), it is possible to figure out the integer equivalent of a linear value by a number of steps of calculation substantially smaller than according to the prior art and efficiently calculate the integer equivalent of a linear value.

What is claimed is:

1. A computer implemented method of converting a linear value to an integer for use in raster graphics comprising the steps of:

inputting a coordinate value X:

calculating the y coordinate value Z of point P having an x coordinate value X in accordance with a core calculation function: f(X, Y); said point P out of the points (hereinafter referred to as "integral lattice point") where each coordinate value is an integer being located in the vicinity of side OA of a triangle OAB consisting of the origin O (0, 0), point A (L, Y), point B (L,0):

$$Z = f(X, Y)$$

wherein $0 \leq X \leq L$, $0 \leq Y \leq L$, X, Y: integers
$L = 2^s - 1$, $S \geq 1$, S: an integer
f(X, Y) satisfies all the conditions below, i) f(0, 0)=0, and f(L, Y)=Y for arbitrary Y ii) for arbitrary $0 \leq X < L$ and arbitrary Y $$f(X+1, Y) = f(X, Y) + 0$$

or $f(X+1, Y) = f(X, Y) + 1$ iii) for arbitrary $0 \leq Y < L$ and arbitrary X $$f(X, Y+1) = f(X, Y) + 0$$

or $f(X, Y+1) = f(X, Y) + 1$ iv) an output Z is obtained without exception after a constant numbers of operating steps for arbitrary inputs X and Y; and outputting the converted coordinate value Z of point P to a raster graphics device.

2. The computer implemented method of converting a linear value to an integer, as set forth in claim 1, using said core calculation function: Z=f(X, Y) whereby Z is calculated by satisfying the following conditions:

[1] when Y=0, Z=0 without exception irrespective of the value of X;

[2] when Y=1, Z=0 if the value of X is in the lower half (i.e. $0 \leq X \leq 2^{s-1} - 1$) or Z=1 if the value of X is in the upper half (i.e. $2^{s-1} \leq X \leq 2^s - 1$);

[3] the value of Z when Y=2n, X=m or Y=2n+1, X=m (n, m: integers, the value of m being in the lower half) is equal to the value of Z when Y=n, X=2m;

[4] at the same value of Y, the value of Z when the value of X is in the upper half is obtained from the value of Z when the value of X is in the lower half in such a manner that:

when Y=2n (n: an integer), $$Z = f(X, Y)$$

takes the same value as f(X', Y)+n, and
when Y=2n+1, $$Z = f(X, Y)$$

takes the same value as f(X', Y)+n+1, wherein X' is a value resulting from the alteration of the MSB (most significant bit) of X (an S bit binary number) from 1 to 0.

3. The computer implemented method of converting a linear value to an integer, as set forth in claim 1, using said core calculation function: Z=f(X, Y) whereby Z is calculated by satisfying the following conditions:

[1] X and Y are S bit inputs,

[2] Y+1=Y' ... an (S+1) bit binary number,

[3] X·(Y+1)=M ... a (2S+1) bit binary number, and

[4] S bits from the second most significant bit to the (S+1)th bit of M constitute Z.

4. The computer implemented method of converting a linear value to an integer, as set forth in claim 3, using said core calculation function: Z=f(X, Y) whereby Z is outputted by hardware in a pipeline manner with respect to inputs X and Y.

5. A pipelined computer processor for converting a linear value to an integer for use in raster graphics comprising:

input means for inputting a coordinate value X;

pipelined logic for calculating the y coordinate value Z of point P having an x coordinate value X in accordance with a core calculation function: f(X, Y); said point P out of the points (hereinafter referred to as "integral lattice point") where each coordinate value is an integer being located in the vicinity of side OA of a triangle OAB consisting of the origin O (0, 0), point A (L, Y), point B (L, 0):

$$Z=f(X, Y)$$

wherein $0 \leq X \leq L$, $0 \leq Y \leq L$, X, Y: integers $L=2^s-1$, $S \geq 1$, S: an integer f(X, Y) satisfies all the conditions below, i) f(0, 0)=0, and f(L, Y)=Y for arbitrary Y ii) for arbitrary $0 \leq X < L$ and arbitrary Y $$f(X+1, Y)=f(X, Y)+0$$

or $f(X+1, Y)=f(X, Y)+1$ iii) for arbitrary $0 \leq Y < L$ and arbitrary X $$f(X, Y+1)=f(X, Y)+0$$

or $f(X, Y+1)=f(X, Y)+1$ iv) an output Z is obtained without exception after a constant numbers of operating steps for arbitrary inputs X and Y; and output means for outputting the converted coordinate value Z of point P to a raster graphics device.

* * * * *